United States Patent
Pan et al.

(10) Patent No.: US 12,140,658 B2
(45) Date of Patent: Nov. 12, 2024

(54) METHOD OF TARGET FEATURE EXTRACTION AND MULTI-TARGET TRACKING BASED ON 4D MILLIMETER WAVE RADAR

(71) Applicant: SHANGHAI GEOMETRICAL PERCEPTION AND LEARNING CO., LTD., Shanghai (CN)

(72) Inventors: Song Pan, Shanghai (CN); Xinfei Lu, Shanghai (CN); Jianjun Zhang, Shanghai (CN); Dan Xue, Shanghai (CN); Songhua Shi, Shanghai (CN)

(73) Assignee: SHANGHAI GEOMETRICAL PERCEPTION AND LEARNING CO., LTD., Shanghai (CN)

( * ) Notice: Subject to any disclaimer, the term of this patent is extended or adjusted under 35 U.S.C. 154(b) by 0 days.

(21) Appl. No.: 18/440,518

(22) Filed: Feb. 13, 2024

(65) Prior Publication Data
US 2024/0288569 A1 Aug. 29, 2024

(30) Foreign Application Priority Data
Feb. 20, 2023 (CN) .......................... 202310133714.9

(51) Int. Cl.
*G01S 13/66* (2006.01)
*G01S 7/41* (2006.01)
(Continued)

(52) U.S. Cl.
CPC .............. *G01S 13/66* (2013.01); *G01S 7/415* (2013.01); *G01S 7/418* (2013.01); *G01S 13/42* (2013.01); *G06F 18/23* (2023.01)

(58) Field of Classification Search
None
See application file for complete search history.

(56) References Cited

U.S. PATENT DOCUMENTS

2019/0122556 A1 4/2019 Thapani et al.
2020/0191942 A1 6/2020 Han et al.

FOREIGN PATENT DOCUMENTS

CN 108427112 A * 8/2018 ........... G01S 13/726
CN 109581378 A * 4/2019 ......... G01S 13/9029
(Continued)

OTHER PUBLICATIONS

M. Ester et al. "A density-based algorithm for discovering clusters in large spatial databases with noise"; Proceedings of the Second International Conference on Knowledge Discovery and Data Mining (KDD-96). AAAI Press; Washington, DC, USA; 1996. pp. 226-231. (Year: 1996).*
N. A. Chaturvedi et al., "Nonlinear Dynamics of the 3D Pendulum"; arXiv:0707.1196v1 [math. DS]; dated Jul. 9, 2007; posted on the Internet at arxiv.org. (Year: 2007).*
(Continued)

*Primary Examiner* — Bernarr E Gregory
(74) *Attorney, Agent, or Firm* — Muncy, Geissler, Olds & Lowe, P.C.

(57) ABSTRACT

A method of target feature extraction and multi-target tracking based on 4D millimeter wave radar includes acquiring the point cloud data output from the radar and preprocess the point cloud data to eliminate the outlier value; processing the points acquired after preprocessing by Density-Based Spatial Clustering of Applications with Noise (DBSCAN) clustering; processing each of the acquired clusters for target feature extraction; predicting the existing trajectory is predicted, and the prediction results are globally correlated with the clustering results; based on the correlation clustering results, the corresponding multi-target tracking motion state processing is executed to obtain the transverse pendulum angular velocity; and based on the target motion state, the target size information as well as the heading angle information are updated.

9 Claims, 4 Drawing Sheets

(51) Int. Cl.
*G01S 13/42* (2006.01)
*G06F 18/23* (2023.01)

(56) References Cited

FOREIGN PATENT DOCUMENTS

| CN | 110361727 | A | * | 10/2019 | ............ G01S 7/418 |
| --- | --- | --- | --- | --- | --- |
| CN | 112198503 | A | | 1/2021 | |
| CN | 113674328 | A | | 11/2021 | |
| CN | 113740836 | A | | 12/2021 | |
| CN | 113866742 | A | | 12/2021 | |
| CN | 114236525 | A | | 3/2022 | |
| CN | 114814820 | A | | 7/2022 | |
| CN | 114859339 | A | | 8/2022 | |
| CN | 115062683 | A | * | 9/2022 | ........... G01S 13/867 |
| JP | 2003130948 | A | | 5/2003 | |

OTHER PUBLICATIONS

M. I. Skolnik, "Radar Handbook"; third edition; published by McGraw-Hill; New York, NY, USA; copyright in the year 2008. (Year: 2008).*

Yu yang, "Application of Kalman Filter in Ship Trajectory Tracking", «Jiangsu Shipbuilding» vol. 22, No. 2 Issue, Feb. 11, 2005, pp. 31-39.

Ma weizhang, "Research on multi-target tracking algorithm", «China Outstanding Master's Degree Thesis Full Text Database Information Science and Technology Series», No. 7. Jul. 15, 2012, pp. 1136-1338.

Nguyen Van Loi etc, "Abnormal Moving Speed Detection Using Combination of Kernel Density Estimator and DBSCAN for Coastal Surveillance Radars", «2020 7th International Conference on Signal Processing and Integrated Networks (SPIN)», Apr. 20, 2020, pp. 143-147.

* cited by examiner

METHOD OF TARGET FEATURE EXTRACTION AND MULTI-TARGET TRACKING BASED ON 4D MILLIMETER WAVE RADAR

FIELD OF TECHNOLOGY

The present invention relates to the technical field of computer vision, in particular to the field of target feature extraction and tracking, and specifically refers to a method, a device, a processor and a computer-readable storage medium thereof for realizing target feature extraction and multi-target tracing based on 4D millimeter wave radar.

DESCRIPTION OF RELATED ARTS

Millimeter wave radar is less affected by environmental factors such as rain, snow, fog, etc., and has all-weather, all-day operating characteristic. Conventional millimeter wave radar detection of targets is usually a single point or a number of strongly reflecting points, although it is possible to measure the velocity information of the target, it is still less information than what can be provided by cameras and lidar. 4D millimeter-wave radar has enhanced angular resolution in both horizontal and pitch directions compared to conventional radar, enabling richer information about the target to be detected. As a result of richer target information, one of the manifestations of which is a greater number of reflected points detected for a single target, conventional millimeter-wave radar point-track-based target tracking methods are difficult to apply directly to 4D millimeter-wave radar and do not fully utilize the information provided by 4D millimeter-wave radar. Among them, the relevant techniques that have been disclosed in the field all suffer from different technical defects, as follows:

Application number: CN202111612665.4 the invention patent application proposes a multi-target tracking and breath detection method and device based on millimeter wave radar. In the multi-target tracking method provided by the invention, a radar point cloud is directly associated to an existing trajectory and the existing trajectory is updated; Density-Based Spatial Clustering of Applications with Noise (DBSCAN) clustering is performed on the remaining unassociated radar point clouds then only the center of the clusters is taken as the start of the new trajectory. The invention does not fully utilize the velocity observation information of the target provided by the millimeter wave radar, and also does not further extract richer target features from the clustered point cloud.

Application number: CN202210473036.6 the invention patent application proposes a multi-target tracking method based on millimeter wave radar. In the multi-target tracking method provided by the invention, the gaussian likelihood function values are calculated by computing the residual and covariance matrices between the radar clustered targets and the trajectory predictions to compute the probability of interconnection. In fact, the radar clustering targets are not in one-to-one correspondence with the state parameters of the trajectory prediction values, and the calculation of the likelihood function requires either the establishment of a target observation model or feature extraction of the radar clustering results to match the trajectory state parameters, neither of which is accounted for in this application. In addition, the application utilizes a probabilistic data correlation filter for Doppler in the trajectory updating step, but the Doppler information measured by the millimeter wave radar is the radial velocity component of the target, and there is a large error in updating the target's kinematic state by directly utilizing this information.

Application number: CN201910661302.6 the invention patent application proposes a multi-target tracking method. In the multi-target tracking method provided by the invention, feature extraction was performed after clustering the radar point cloud data. The invention takes the average coordinates of the same class of points as an estimate of the target coordinates; the absolute value of the maximum difference between the x-axis and y-axis of the same class of points and the average coordinates as the long and short axes as an estimate of the target's dimensions; and the average value of the velocity of the same class of points as an estimate of the target's velocity. The radar target feature extraction method provided by the invention is only applicable to targets that move in a straight line along the x-axis or y-axis, and when the target is deflected, its estimated target size is large and lacks heading information; when the direction of the target's motion is not relative to the radial motion of the radar, the mean value of the velocity at the same class of points only reflects the radial component of the target's velocity, and there is a large error in updating the target's velocity directly with this.

In summary, based on the relevant technical content disclosed in the prior art, there are technical functional limitations that cannot simultaneously satisfy the comprehensive assessment of precision tracking and observation correlation reliability.

SUMMARY OF THE INVENTION

It is an object of the present invention to overcome the drawbacks of the above-mentioned prior art, and to provide a method, device, processor, and computer-readable storage medium of target feature extraction and multi-target tracking based on 4D millimeter wave radar.

In order to achieve the above objectives, the method, device, processor, and computer-readable storage medium of target feature extraction and multi-target tracking based on 4D millimeter wave radar are as follows:

The method of target feature extraction and multi-target tracking based on 4D millimeter wave radar, the main feature of which is that the said method comprises following steps:

(1) Acquire the point cloud data output from the radar and preprocess the point cloud data to eliminate the outlier value;

(2) The points acquired after preprocessing are processed by DBSCAN clustering;

(3) Each of the acquired clusters is processed for target feature extraction;

(4) The existing trajectory is predicted, and the prediction results are globally correlated with the clustering results;

(5) Based on the correlation clustering results, the corresponding multi-target tracking motion state processing is executed to obtain the transverse pendulum angular velocity;

(6) Based on the target motion state, the target size information as well as the heading angle information are updated.

Preferably, the said step (1) is specifically:

Acquiring point cloud data output from the radar and performing data preprocessing of said point cloud data to remove points with abnormal velocities, remove points with abnormal heights, and filter points outside the region of interest to remove outlier values.

Preferably, the said step (2) is specifically:

the DBSCAN clustering process is performed based on the coordinate position of each point in the point cloud information and the relative radial velocity as:

$$\begin{cases} |x_i - x_j| < 0.5 \text{ m} \\ |y_i - y_j| < 0.5 \text{ m} \\ |z_i - z_j| < 2.0 \text{ m} \\ |vr_i - vr_j| < 2.0 \text{ m/s} \end{cases}$$

where i, j denote the indexes of the two points involved in the discrimination, x, y, z denote the coordinate position of each point respectively, and vr denotes the relative radial velocity.

Preferably, the said step (3) specifically comprises the following steps:

(3.1) calculate the clustered mean radial velocity $\overline{vr}$, the x-mean $\overline{x}$ and the y-mean $\overline{y}$;

(3.2) the maximum and minimum values of the clustered points in the z direction are counted, and the difference of the maximum value minus the minimum value is used as the cluster height feature;

(3.3) subtract $\overline{x}$, $\overline{y}$ from the x, y coordinates of each point under the same clustering to get $x_i$, $y_i$ respectively;

(3.4) traversing the range 0 to 90° at 1° intervals and rotating all the resulting $x_i$, $y_i$ at each angle, determine the rotated $x_{max}$, $y_{max}$, $x_{min}$ and $y_{min}$, and compute the loss function using the following equation:

$$\text{Loss} = \sum_{i=1}^{N} \min(x_i - x_{min}, x_{max} - x_i, y_i - y_{min}, y_{max} - y_i)$$

the minimum angular value of angle and the corresponding $x_{max}$, $y_{max}$, $x_{min}$ and $y_{min}$ of the said loss function are also recorded;

(3.5) use the larger of $(x_{max} - x_{min})$ and $(y_{max} - y_{min})$ as the clustering length feature and the smaller as the clustering width feature, and use the mean $x_{mean}$ of $x_{mean}$, $x_{min}$ and the mean $y_{mean}$ of $y_{max}$, $y_m$ in after rotating by—angle, and then add $\overline{x}$, $\overline{y}$ to get the value as the clustering center coordinates $(x_c, y_c)$;

(3.6) if $(x_{max} - x_{min}) < (y_{max} - y_{min})$, angle increases by 90 degrees, and the angle is more than 90 degrees with the direction of the average radial velocity $\overline{vr}$, then the angle is increased by another 180 degrees and the final angle value is taken as the heading angle feature for clustering;

(3.7) according to the said clustering center coordinates, clustering length features, clustering width features, clustering height features and heading angle features obtained as described above, a clustered rectangular target bounding box is constructed for subsequent target feature extraction processing.

Preferably, the said step (4) specifically comprises the following steps:

(4.1) the motion states are taken as x, $v_x$, $a_x$, y, $v_y$, $a_y$ and the existing trajectory prediction is processed using linear Kalman filtering as:

$$\begin{bmatrix} x_{pred} \\ v_{xpred} \\ a_{xpred} \\ y_{pred} \\ v_{ypred} \\ a_{ypred} \end{bmatrix} = \begin{bmatrix} 1 & T & 0.5T^2 & 0 & 0 & 0 \\ 0 & 1 & T & 0 & 0 & 0 \\ 0 & 0 & 1 & 0 & 0 & 0 \\ 0 & 0 & 0 & 1 & T & 0.5T^2 \\ 0 & 0 & 0 & 0 & 1 & T \\ 0 & 0 & 0 & 0 & 0 & 1 \end{bmatrix} \begin{bmatrix} x \\ v_x \\ a_x \\ y \\ v_y \\ a_y \end{bmatrix}$$

where $v_x$ is the x-direction velocity component, $a_x$ is the x-direction acceleration component, $v_y$ is the y-direction velocity component, $a_y$ is the y-direction acceleration component, $x_{pred}$ is the predicted value of the target's x-direction position, $v_{xpred}$ is the predicted value of the x-direction velocity component, $a_{xpred}$ is the predicted value of the x-direction acceleration component, $y_{pred}$ is the predicted value of the target's y-direction position, $v_{ypred}$ is the predicted value of the y-direction velocity component, $a_{ypred}$ is the predicted value of the y-direction acceleration component, and T is the time interval between the neighboring two frames of radar point cloud;

(4.2) calculate the diagonal length dist_cri_1 using the length and width of the existing trajectory:

$$\text{dist\_cri\_1} = \sqrt{\text{the length of the existing trajectory}^2 + \text{the width of the existing trajectory}^2}$$

the diagonal length dist_cri_2 is calculated using the clustered length and width features:

$$\text{dist\_cri\_2} = \sqrt{\text{clustered length features}^2 + \text{clustered width features}^2}$$

and weighted by weights of 0.6 and 0.4 to calculate the upper limit of the association distance dist_cri $$\text{dist\_cri} = \sqrt{0.6 \times \text{dist\_cri\_1} + 0.4 \times \text{dist\_cri\_2}}$$

calculate the Euclidean distance dist between the predicted position of the existing trajectory (xpred, $y_{pred}$) and the clustering center:

$$\text{dist} = \sqrt{(x_c - x_{pred})^2 + (y_c - y_{pred})^2}$$

and calculate the distance correlation score according to the following equation:

$$\text{distance\_score} = \begin{cases} 0, & \text{dist} > \text{dist\_cri} \\ \left(1 - \dfrac{\text{dist}}{\text{dist\_cri}}\right) \times 100, & \text{dist} \leq \text{dist\_cri} \end{cases}$$

(4.3) based on the existing trajectory prediction position, the clustering position, the size, and the heading angle, the coordinates of the vertices of each vertex of the said clustered rectangular target bounding box and the area of the rectangular box are calculated, and the size correlation score is calculated according to the following equation:

$$
\text{area\_score} = \begin{cases} 100, & \text{An overlap between the existing trajectories and the clustering results} \\ \left(1 - \dfrac{\min(\text{existing trajectory area, cluster area})}{\max(\text{existing trajectory area, cluster area})}\right) \times 100, & \text{otherwise} \end{cases}
$$

(4.4) based on the predicted positions, predicted velocities and pendulum angular velocities of the existing trajectories, the predicted radial velocities of each point of the to-be-associated clusters are calculated by the following equation:

$$v_{ri} = (v_{xpred} - \omega y_{pred})\cos\varphi_i + (v_{ypred} + \omega x_{pred})\sin\varphi_i$$

where $v_{ri}$ denotes the predicted radial velocity, $\omega$ denotes the target transverse swing angular velocity, and $\varphi_i$ denotes the radial velocity direction of each point in the clustered point cloud;

the average predicted radial velocity is acquired by averaging the predicted radial velocities at each point within the same cluster, and the difference is made with the measured average radial velocity of the cluster, get the difference delta_vr, and calculate the speed correlation score by using the following equation:

$$\text{velocity\_score} = \begin{cases} 0, & |\text{delta\_yr}| > \text{vr\_cri} \\ \left(1 - \dfrac{|\text{delta\_vr}|}{\text{vr\_cri}}\right) \times 100, & |\text{delta\_yr}| \le \text{vr\_cri} \end{cases}$$

where vr_cri is the preset threshold;

(4.5) the distance correlation score, size correlation score, and speed correlation score acquired from the above calculations are weighted and summed to obtain the final correlation score of the trajectory with the clusters;

(4.6) construct an association matrix based on the final association scores of each cluster with each existing trajectory, including: the number of rows of the matrix is equal to the number of existing trajectories, the number of columns of the matrix is the number of current clusters, the value of the i-th row and j-th column of the matrix is the association score of the i-th existing track with the j-th cluster, and the global association matching is performed based on the association matrix.

Preferably, the said step (5) comprises:

compute observation model of trajectories using the following equation:

$$\begin{pmatrix} x_c \\ y_c \\ \overline{v_r} \end{pmatrix} = \begin{bmatrix} 1 & 0 & 0 & 0 & 0 & 0 \\ 0 & 0 & 0 & 1 & 0 & 0 \\ 0 & \overline{\cos\varphi} & 0 & 0 & \overline{\sin\varphi} & 0 \end{bmatrix} \begin{pmatrix} x \\ vx \\ ax \\ y \\ vy \\ ay \end{pmatrix}$$

where $x_c$, $y_c$ are the clustering centers, $\overline{v_r}$ is the mean radial velocity of the clustered point cloud, $\overline{\cos\varphi}$ is the average cosine of the mean azimuthal observations of the clustered point cloud, $\overline{\sin\varphi}$ is the average sinusoidal of the mean azimuthal observations of the clustered point cloud, x, vx, ax, y, vy and ay are the motion states of the trajectory.

Preferably, the said step (5) specifically comprises the following steps:

(5.1) Determine whether the corresponding clusters are successfully associated with each existing trajectory, if yes, go to step (5.2), otherwise, go to step (5.4);

(5.2) For the associated pre-existing trajectories, the predicted observations $x_{cpred}$, $y_{cpred}$ and $\overline{v_{rpred}}$ are computed for the trajectories based on the trajectory predicted motion state and the said trajectory observation model:

$$\begin{pmatrix} x_{cpred} \\ y_{cpred} \\ \overline{v_{rpred}} \end{pmatrix} = \begin{bmatrix} 1 & 0 & 0 & 0 & 0 & 0 \\ 0 & 0 & 0 & 1 & 0 & 0 \\ 0 & \overline{\cos\varphi} & 0 & 0 & \overline{\sin\varphi} & 0 \end{bmatrix} \begin{pmatrix} x_{pred} \\ v_{xpred} \\ \alpha_{xpred} \\ y_{pred} \\ v_{ypred} \\ a_{ypred} \end{pmatrix}$$

(5.3) The corresponding clustered eigenvalues under this clustering are subtracted from the predicted observations to get the residuals, and multiply this residual by the Kalman gain matrix K and add the trajectory predicted motion state to get the updated result of the already associated trajectory motion state:

$$\begin{pmatrix} x_{update} \\ v_{xupdate} \\ a_{xupdate} \\ y_{update} \\ v_{yupdate} \\ a_{yupdate} \end{pmatrix} = K\left(\begin{pmatrix} x_c \\ y_c \\ \overline{v_r} \end{pmatrix} - \begin{pmatrix} x_{cpred} \\ y_{cpred} \\ \overline{v_{rpred}} \end{pmatrix}\right) + \begin{pmatrix} x_{pred} \\ v_{xpred} \\ \alpha_{xpred} \\ y_{pred} \\ v_{ypred} \\ a_{ypred} \end{pmatrix}$$

where $x_{update}$, $v_{xupdate}$, $a_{xupdate}$, $y_{update}$, $v_{yupdate}$ and $a_{yupdate}$ are the updated trajectory motion states;

(5.4) eliminate the determination of the trajectory that fails to be associated, if its consecutive cumulative number of unassociated times is less than a preset threshold, the trajectory prediction result will be used as the update result to continue the trajectory extrapolation, otherwise the trajectory will be deleted directly;

(5.5) A new trajectory is created for the clusters with failed associations, and the motion state parameters of the new trajectory are expressed using the following equation:

$$\begin{bmatrix} x \\ v_x \\ a_x \\ y \\ v_y \\ a_y \end{bmatrix} = \begin{bmatrix} x_c \\ \dfrac{\overline{v_r}}{\cos(\text{orient} - \text{vrAngle})} \times \cos(\text{orient}) \\ 0 \\ y_c \\ \dfrac{\overline{v_r}}{\cos(\text{orient} - \text{vrAngle})} \times \sin(\text{orient}) \\ 0 \end{bmatrix}$$

where orient is the clustered heading angle feature, vrAngle is the mean direction angle of the radial velocity of the point cloud, $x_c$, $y_c$ are the clustering centers, and $\overline{v_r}$ is the mean radial velocity of the clustered point cloud;

(5.6) Based on the currently acquired update results of the associated trajectory motion state, the trajectory extrapolation results, and the calculation results of the new trajectory motion state, the corresponding transverse pendulum angular velocity $\omega$ is calculated by the following equation:

$$|\omega| = \frac{\sqrt{a_x^2 + a_y^2}}{\sqrt{v_x^2 + v_y^2}}$$

where the positive and negative values of $v_x \cdot a_y - v_y \cdot a_x$, the result of the cross-multiplication of the velocity vector and the acceleration vector, are taken as the positive and negative values of the transverse pendulum angular velocity.

Preferably, the said step (5.5) specifically comprises the following steps:
(5.5.1) Using the center of clustering as the new track start position;
(5.5.2) Using clustered heading angle features as velocity directions for new trajectories, the clustered mean radial velocities are back-projected into the heading angle direction to obtain the velocity of the new trajectory;
(5.5.3) Take the new trajectory acceleration to zero;
(5.5.4) Take said clustered length feature as the length of the new trajectory, take said clustered width feature as the width of the new trajectory, and take the clustered heading angle feature as the heading angle of the new trajectory.

Preferably, the said step (6) specifically comprises the following steps:
(6.1) The trajectory length is weighted and averaged with the clustered length features to get the trajectory length update results, and the trajectory width is weighted and averaged with the clustered width features to get the trajectory width update results;
(6.2) Based on the velocity vector and acceleration vector of the trajectory motion state, the acceleration component perpendicular to the direction of the velocity vector is computed, the magnitude of the transverse pendulum angular velocity of the target is then obtained by dividing the mode of the vertical acceleration component by the mode of the velocity vector, and the direction of the cross product of the velocity vector and the acceleration vector is the direction of the transverse pendulum angular velocity;
(6.3) The velocity heading angle is calculated based on the trajectory speed, and the clustered heading angle features, velocity heading angle, and trajectory heading angle are weighted and averaged to obtain the trajectory heading angle update results.

The device of target feature extraction and multi-target tracking based on 4D millimeter wave radar, the main feature of which is that the said device comprises:
processor, configured to execute computer-executable instructions;
memory, storing one or more computer-executable instructions, when the said computer-executable instructions are executed by the said processor, various steps for realizing the method of target feature extraction and multi-target tracking based on 4D millimeter wave radar as claimed in above-described.

The processor of target feature extraction and multi-target tracking based on 4D millimeter wave radar, the main feature of which is that the said processor being configured to execute computer-executable instructions, when the said processor being configured to execute computer-executable instructions, various steps for realizing the method of target feature extraction and multi-target tracking based on 4D millimeter wave radar as claimed in above-described.

The computer-readable storage medium, the main feature of which is that the computer program stored on it, and the said computer program may be executed by a processor to implement the various steps for realizing the method of target feature extraction and multi-target tracking based on 4D millimeter wave radar as claimed in above-described.

With the use of this method, device, processor, and computer-readable storage medium of target feature extraction and multi-target tracking based on 4D millimeter wave radar, compared with the traditional radar multi-target tracking method, it obtains information such as target size and heading angle in addition to position from the radar clustered point cloud, and fully combines this information to improve the reliability of the association between trajectory and observation in multi-target tracking; and for 4D millimeter-wave radar, a new trajectory observation model is provided, through which individual observation points of the same target can be fully utilized to update in concert; In addition to this, the present invention introduces a target transverse pendulum angular velocity as a means to enable more stable tracking of turning maneuvering targets.

DETAILED DESCRIPTION OF THE PREFERRED EMBODIMENT

In order to be able to understand the technical content of the present invention more clearly, is further exemplified by the following detailed description of embodiments.

Before describing in detail the embodiments according to the present invention, it should be noted that, in the following, the terms "including", "comprising" or any other variant are intended to cover non-exclusive inclusion, so that a processes, methods, goods, or equipment comprising a set of elements contains more than just those elements, and it also contains other elements that are not explicitly listed or that are inherent to such processes, methods, goods, or equipment.

Figure 1:
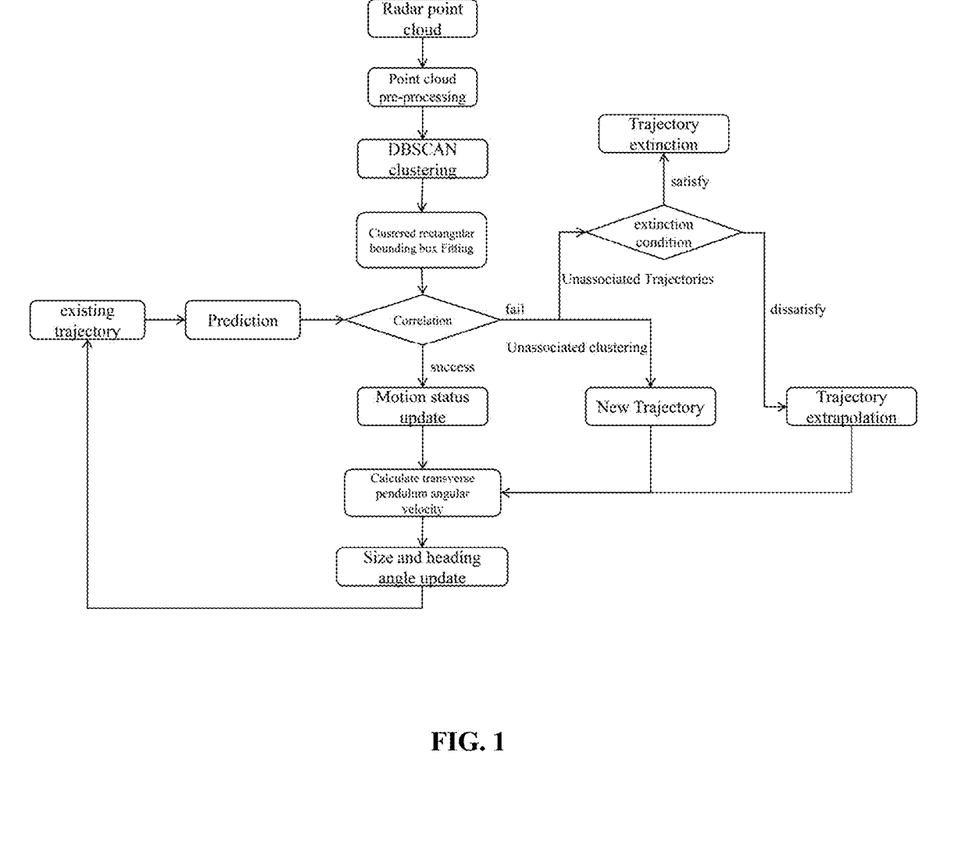
FIG. 1 shows a flowchart of a method for realizing target feature extraction and multi-target tracking based on a 4D millimeter wave radar of the present invention.

Referring to FIG. 1, the method of target feature extraction and multi-target tracking based on 4D millimeter wave radar, wherein the said method comprises following steps:
(1) Acquire the point cloud data output from the radar and preprocess the point cloud data to eliminate the outlier value;
(2) The points acquired after preprocessing are processed by DBSCAN clustering;
(3) Each of the acquired clusters is processed for target feature extraction;
(4) The existing trajectory is predicted, and the prediction results are globally correlated with the clustering results;
(5) Based on the correlation clustering results, the corresponding multi-target tracking motion state processing is executed to obtain the transverse pendulum angular velocity;

(6) Based on the target motion state, the target size information as well as the heading angle information are updated.

As a preferred embodiment of the present invention, the said step (1) is specifically:

Acquiring point cloud data output from the radar and performing data preprocessing of said point cloud data to remove points with abnormal velocities, remove points with abnormal heights, and filter points outside the region of interest to remove outlier values.

As a preferred embodiment of the present invention, the said step (2) is specifically:

the DBSCAN clustering process is performed based on the coordinate position of each point in the point cloud information and the relative radial velocity as:

$$\begin{cases} |x_i - x_j| < 0.5 \text{ m} \\ |y_i - y_j| < 0.5 \text{ m} \\ |z_i - z_j| < 2.0 \text{ m} \\ |vr_i - vr_j| < 2.0 \text{ m/s} \end{cases}$$

where i, j denote the indexes of the two points involved in the discrimination, x, y, z denote the coordinate position of each point respectively, and vr denotes the relative radial velocity;

As a preferred embodiment of the present invention, the said step (3) specifically comprises the following steps:

(3.1) calculate the clustered mean radial velocity $\overline{vr}$, the x-mean $\overline{x}$ and the y-mean $\overline{y}$;

(3.2) the maximum and minimum values of the clustered points in the z direction are counted, and the difference of the maximum value minus the minimum value is used as the cluster height feature;

(3.3) subtract $\overline{x}$, $\overline{y}$ from the x, y coordinates of each point under the same clustering to get $x_i$, $y_i$ respectively;

(3.4) traversing the range 0 to 90° at 1° intervals and rotating all the resulting $x_i$, $y_i$ at each angle, determine the rotated $x_{max}$, $y_{max}$, $x_{min}$ and $y_{min}$, and compute the loss function using the following equation:

$$\text{Loss} = \sum_{i=1}^{N} \min(x_i - x_{min}, x_{max} - x_i, y_i - y_{min}, y_{max} - y_i)$$

the minimum angular value of angle and the corresponding $x_{max}$, $y_{max}$, $x_{min}$ and $y_{min}$ of the said loss function are also recorded;

(3.5) use the larger of $(x_{max} - x_{min})$ and $(y_{max} - y_{min})$ as the clustering length feature and the smaller as the clustering width feature, and use the mean $x_{mean}$ of $x_{max}$, $x_{min}$ and the mean $y_{mean}$ of $y_{max}$, $y_{min}$ after rotating by −angle, and then add $\overline{x}$, $\overline{y}$ to get the value as the clustering center coordinates $(x_c, y_c)$;

(3.6) if $(x_{max} - x_{min}) < (y_{max} - y_{min})$, angle increases by 90 degrees, and the angle is more than 90 degrees with the direction of the average radial velocity $\overline{vr}$, then the angle is increased by another 180 degrees and the final angle value is taken as the heading angle feature for clustering;

(3.7) according to the said clustering center coordinates, clustering length features, clustering width features, clustering height features and heading angle features obtained as described above, a clustered rectangular target bounding box is constructed for subsequent target feature extraction processing;

As a preferred embodiment of the present invention, the said step (4) specifically comprises the following steps:

(4.1) the motion states are taken as x, $v_x$, $a_x$, y, $v_y$, $a_y$ and the existing trajectory prediction is processed using linear Kalman filtering as:

$$\begin{bmatrix} x_{pred} \\ v_{xpred} \\ a_{xpred} \\ y_{pred} \\ v_{ypred} \\ a_{ypred} \end{bmatrix} = \begin{bmatrix} 1 & T & 0.5T^2 & 0 & 0 & 0 \\ 0 & 1 & T & 0 & 0 & 0 \\ 0 & 0 & 1 & 0 & 0 & 0 \\ 0 & 0 & 0 & 1 & T & 0.5T^2 \\ 0 & 0 & 0 & 0 & 1 & T \\ 0 & 0 & 0 & 0 & 0 & 1 \end{bmatrix} \begin{bmatrix} x \\ v_x \\ a_x \\ y \\ v_y \\ a_y \end{bmatrix}$$

where $v_x$ is the x-direction velocity component, $a_x$ is the x-direction acceleration component, $v_y$ is the y-direction velocity component, $a_y$ is the y-direction acceleration component, $x_{pred}$ is the predicted value of the target's x-direction position, $v_{xpred}$ is the predicted value of the x-direction velocity component, $a_{xpred}$ is the predicted value of the x-direction acceleration component, $y_{pred}$ is the predicted value of the target's y-direction position, $v_{ypred}$ is the predicted value of the y-direction velocity component, $a_{ypred}$ is the predicted value of the y-direction acceleration component, and T is the time interval between the neighboring two frames of radar point cloud;

(4.2) calculate the diagonal length dist_cri_1 using the length and width of the existing trajectory:

$$\text{dist\_cri\_1} = \sqrt{\text{the length of the existing trajectory}^2 + \text{the width of the existing trajectory}^2}$$

the diagonal length dist_cri_2 is calculated using the clustered length and width features:

$$\text{dist\_cri\_2} = \sqrt{\text{clustered length features}^2 + \text{clustered width features}^2}$$

and weighted by weights of 0.6 and 0.4 to calculate the upper limit of the association distance dist_cri $$\text{dist\_cri} = 0.6 \times \text{dist\_cri\_1} + 0.4 \times \text{dist\_cri\_2}$$

calculate the Euclidean distance dist between the predicted position of the existing trajectory $(x_{pred}, y_{pred})$ and the clustering center:

$$\text{dist} = \sqrt{(x_c - x_{pred})^2 + (y_c - y_{pred})^2}$$

and calculate the distance correlation score according to the following equation:

$$\text{distance\_score} = \begin{cases} 0, & \text{dist} > \text{dist\_cri} \\ \left(1 - \dfrac{\text{dist}}{\text{dist\_cri}}\right) \times 100, & \text{dist} \leq \text{dist\_cri} \end{cases}$$

(4.3) based on the existing trajectory prediction position, the clustering position, the size, and the heading angle, the coordinates of the vertices of each vertex of the said clustered rectangular target bounding box and the area of the rectangular box are calculated, and the size correlation score is calculated according to the following equation:

$$\text{area\_score} = \begin{cases} 100, & \text{An overlap between the existing trajectories and the clustering results} \\ \left(1 - \dfrac{\min(\text{existing trajectory area, cluster area})}{\max(\text{existing trajectory area, cluster area})}\right) \times 100, & \text{otherwise} \end{cases}$$

(4.4) based on the predicted positions, predicted velocities and pendulum angular velocities of the existing trajectories, the predicted radial velocities of each point of the to-be-associated clusters are calculated by the following equation:

$$v_{ri} = (v_{pred} - \omega y_{pred})\cos \omega_i + (v_{ypred} + \omega x_{pred})\sin \omega_i$$

where $v_{ri}$ denotes the predicted radial velocity, ω denotes the target transverse swing angular velocity, and $\varphi_i$ denotes the radial velocity direction of each point in the clustered point cloud; the average predicted radial velocity is acquired by averaging the predicted radial velocities at each point within the same cluster, and the difference is made with the measured average radial velocity of the cluster, get the difference delta_vr, and calculate the speed correlation score by using the following equation:

$$\text{velocity\_score} = \begin{cases} 0, & |\text{delta\_vr}| > \text{vr\_cri} \\ \left(1 - \dfrac{|\text{delta\_vr}|}{\text{vr\_cri}}\right) \times 100, & |\text{delta\_vr}| \leq \text{vr\_cri} \end{cases}$$

where vr_cri is the preset threshold;

(4.5) the distance correlation score, size correlation score, and speed correlation score acquired from the above calculations are weighted and summed to obtain the final correlation score of the trajectory with the clusters;

(4.6) construct an association matrix based on the final association scores of each cluster with each existing trajectory, including: the number of rows of the matrix is equal to the number of existing trajectories, the number of columns of the matrix is the number of current clusters, the value of the i-th row and j-th column of the matrix is the association score of the i-th existing track with the j-th cluster, and the global association matching is performed based on the association matrix.

As a preferred embodiment of the present invention, the said step (5) comprises:
compute observation model of trajectories using the following equation:

$$\begin{pmatrix} x_c \\ y_c \\ \overline{v_r} \end{pmatrix} = \begin{bmatrix} 1 & 0 & 0 & 0 & 0 & 0 \\ 0 & 0 & 0 & 1 & 0 & 0 \\ 0 & \overline{\cos\varphi} & 0 & 0 & \overline{\sin\varphi} & 0 \end{bmatrix} \begin{pmatrix} x \\ vx \\ ax \\ y \\ vy \\ ay \end{pmatrix}$$

where $x_c$, $y_c$ are the clustering centers, $\overline{v}_r$ is the mean radial velocity of the clustered point cloud, $\overline{\cos\varphi}$ is the average cosine of the mean azimuthal observations of the clustered point cloud, $\overline{\sin\varphi}$ is the average sinusoidal of the mean azimuthal observations of the clustered point cloud, x, vx, ax, y, vy and ay are the motion states of the trajectory.

As a preferred embodiment of the present invention, the said step (5) specifically comprises the following steps:

(5.1) Determine whether the corresponding clusters are successfully associated with each existing trajectory, if yes, go to step (5.2), otherwise, go to step (5.4);

(5.2) For the associated pre-existing trajectories, the predicted observations $x_{cpred}$, $y_{cpred}$ and $\overline{v_{rpred}}$ are computed for the trajectories based on the trajectory predicted motion state and the said trajectory observation model:

$$\begin{pmatrix} x_{cpred} \\ y_{cpred} \\ \overline{v_{rpred}} \end{pmatrix} = \begin{bmatrix} 1 & 0 & 0 & 0 & 0 & 0 \\ 0 & 0 & 0 & 1 & 0 & 0 \\ 0 & \overline{\cos\varphi} & 0 & 0 & \overline{\sin\varphi} & 0 \end{bmatrix} \begin{pmatrix} x_{pred} \\ v_{xpred} \\ a_{xpred} \\ y_{pred} \\ v_{ypred} \\ a_{ypred} \end{pmatrix}$$

(5.3) The corresponding clustered eigenvalues under this clustering are subtracted from the predicted observations to get the residuals, and multiply this residual by the Kalman gain matrix K and add the trajectory predicted motion state to get the updated result of the already associated trajectory motion state:

$$\begin{pmatrix} x_{update} \\ v_{xupdate} \\ a_{xupdate} \\ y_{update} \\ v_{yupdate} \\ a_{yupdate} \end{pmatrix} = K\left(\begin{pmatrix} x_c \\ y_c \\ \overline{v_r} \end{pmatrix} - \begin{pmatrix} x_{cpred} \\ y_{cpred} \\ \overline{v_{rpred}} \end{pmatrix}\right) + \begin{pmatrix} x_{pred} \\ v_{xpred} \\ a_{xpred} \\ y_{pred} \\ v_{ypred} \\ a_{ypred} \end{pmatrix}$$

where $x_{update}$, $v_{xupdate}$, $a_{xupdate}$, $y_{update}$, $v_{yupdate}$ and $a_{yupdate}$ are the updated trajectory motion states;

(5.4) eliminate the determination of the trajectory that fails to be associated, if its consecutive cumulative number of unassociated times is less than the preset threshold, the trajectory prediction result will be used as the update result to continue the trajectory extrapolation, otherwise the trajectory will be deleted directly;

(5.5) A new trajectory is created for the clusters with failed associations, and the motion state parameters of the new trajectory are expressed using the following equation:

$$\begin{bmatrix} x \\ v_x \\ a_x \\ y \\ v_y \\ a_y \end{bmatrix} = \begin{bmatrix} x_c \\ \dfrac{\overline{v_r}}{\cos(\text{orient} - \text{vrAngle})} \times \cos(\text{orient}) \\ 0 \\ y_c \\ \dfrac{\overline{v_r}}{\cos(\text{orient} - \text{vrAngle})} \times \sin(\text{orient}) \\ 0 \end{bmatrix}$$

where orient is the clustered heading angle feature, vrAngle is the mean direction angle of the radial velocity of the point cloud, $x_c$, $y_c$ are the clustering centers, and $\overline{v}_r$ is the mean radial velocity of the clustered point cloud;

(5.6) Based on the currently acquired update results of the associated trajectory motion state, the trajectory extrapolation results, and the calculation results of the new trajectory motion state, the corresponding transverse pendulum angular velocity ω is calculated by the following equation:

$$|\omega| = \frac{\sqrt{a_x^2 + a_y^2}}{\sqrt{v_x^2 + v_y^2}}$$

where the positive and negative values of $v_x \cdot a_y - v_y \cdot a_x$, the result of the cross-multiplication of the velocity vector and the acceleration vector, are taken as the positive and negative values of the transverse pendulum angular velocity.

As a preferred embodiment of the present invention, the said step (5.5) specifically comprises the following steps:
(5.5.1) Using the center of clustering as the new track start position;
(5.5.2) Using clustered heading angle features as velocity directions for new trajectories, the clustered mean radial velocities are back-projected into the heading angle direction to obtain the velocity of the new trajectory;
(5.5.3) Take the new trajectory acceleration to zero;
(5.5.4) Take said clustered length feature as the length of the new trajectory, take said clustered width feature as the width of the new trajectory, and take the clustered heading angle feature as the heading angle of the new trajectory.

As a preferred embodiment of the present invention, the said step (6) specifically comprises the following steps:
(6.1) The trajectory length is weighted and averaged with the clustered length features to get the trajectory length update results, and the trajectory width is weighted and averaged with the clustered width features to get the trajectory width update results;
(6.2) Based on the velocity vector and acceleration vector of the trajectory motion state, the acceleration component perpendicular to the direction of the velocity vector is computed, the magnitude of the transverse pendulum angular velocity of the target is then obtained by dividing the mode of the vertical acceleration component by the mode of the velocity vector, and the direction of the cross product of the velocity vector and the acceleration vector is the direction of the transverse pendulum angular velocity;
(6.3) The velocity heading angle is calculated based on the trajectory speed, and the clustered heading angle features, velocity heading angle, and trajectory heading angle are weighted and averaged to obtain the trajectory heading angle update results.

In practical application, this target feature extraction method provided by the present invention mainly includes the following steps: 1. calculate the clustered mean radial velocity, mean x-value and mean y-value; 2. determine the extreme deviation of the clustered points in the z-axis direction to get the clustering height characteristics; 3. will be within the same class of x, y coordinates of each point minus x, y mean, traversing the range of 0 to 90 degrees, for each angle, in the xoy plane will be subtracted from the mean value of the point rotated to the corresponding angular value, and to determine the maximum value of the rotated x value $x_{max}$, the maximum value of y value $y_{max}$, the minimum x value of $x_{min}$ and the minimum value of y value $y_{min}$ the calculation of the loss function is as follows:

$$Loss = \sum_{i=1}^{N} \min(x_i - x_{min}, x_{max} - x_i, y_i - y_{min}, y_{max} - y_i)$$

where $x_i$, $y_i$ denotes the coordinates of the points after subtracting the mean and rotating, N denotes the number of points in the same category, and min( ) denotes taking the smallest of the four. Obtain the angle value angle that minimizes the above loss function and the corresponding $x_{max}$, $y_{max}$, $x_{min}$ and $y_{min}$. 4. Use the larger of $(x_{max}-x_{min})$ and $(y_{max}-y_{min})$ as the clustering length feature and the smaller as the clustering width feature. The mean $x_{mean}$ of $x_{max}$, $x_{min}$ and the mean $y_{mean}$ of $y_{max}$, $y_{min}$ are used as the cluster center coordinates after rotating −angle and adding the mean x, y of the point cloud. 5. If $(x_{max}-x_{min})<(y_{max}-y_{min})$, angle increases by 90 degrees; if the angle between the direction of angle and the direction of the average radial velocity (the average velocity is greater than zero, then pointing to the center of the clusters from the origin, and vice versa, pointing to the origin from the center of the clusters) is more than 90 degrees, the angle is increased by another 180 degrees. The final angle value is taken as the heading angle feature of the clusters.

In practical application, the multi-target tracking method provided by the present invention mainly comprises the following steps: 1. acquire the point cloud data output from the radar, pre-process the point cloud and eliminate the outlier value; 2. clustering based on position, relative radial velocity, reflection intensity, etc. in the point cloud information and target feature extraction using the method provided by the present invention; 3. predict the current existing trajectory, and match the prediction results with the clustering results; 4. for trajectories on the association, update, and for unassociated tracks, extrapolate or extinguish; 5. generate new trajectories for unassociated clustering results; 6. for the trajectory currently being tracked, the target size information is updated according to its associated clustering results, the transverse pendulum angular velocity is calculated according to the target motion state, and the heading angle is updated according to the clustering results and the target motion state.

The matching association of the trajectory prediction results with the clustering results of step 3 comprises the following steps: 3.1. calculate the upper limit of the association distance dist_cri based on the size of the clusters and the size of the existing trajectories; calculate the Euclidean distance dist between the predicted position of the trajectory and the clustering center; calculate the distance correlation score using dist and dist_cri. 3.2 calculation of size correlation scores based on clustered positions, dimensions, and heading angles with those of existing trajectories. 3.3 predicted radial velocities for each point of the cluster to be correlated are calculated based on the predicted positions, predicted velocities, and transverse pendulum angular velocity of the existing trajectories:

$$v_{ri}=(v_x-\omega y)\cos \varphi_i+(v_y+\omega x)\sin \varphi_i$$

where $v_{ri}$ denotes the predicted radial velocity, $v_x$, $v_y$ denote the velocity of trajectory prediction, ω denotes the target transverse swing angular velocity, and $\varphi_i$ denotes the radial velocity direction of each point in the clustered point cloud; the average predicted radial velocity is acquired by averaging the predicted radial velocities at each point within the same cluster, and the difference is made with the measured average radial velocity of the cluster, get the difference delta_vr, to calculate the speed correlation score. 3.4 the distance correlation score, size correlation score, and speed correlation score acquired are weighted and summed to obtain the final correlation score of the trajectory with the clusters; 3.5 construct an association matrix based on the final association scores of each cluster with each existing trajectory, perform a global association match.

The correlated trajectory update in step 4 first requires a trajectory observation model. Aiming at the characteristic that a 4D millimeter wave radar can observe a point cloud of the target and only the radial velocity of the target relative to the radar, the present invention provides an observation model as follows:

$$\begin{pmatrix} x_c \\ y_c \\ \overline{v_r} \end{pmatrix} = \begin{bmatrix} 1 & 0 & 0 & 0 & 0 & 0 \\ 0 & 0 & 0 & 1 & 0 & 0 \\ 0 & \overline{\cos\varphi} & 0 & 0 & \overline{\sin\varphi} & 0 \end{bmatrix} \begin{pmatrix} x \\ vx \\ ax \\ y \\ vy \\ ay \end{pmatrix}$$

where $x_c$, $y_c$ are the clustering centers, $\overline{v}_r$ is the mean radial velocity of the clustered point cloud, $\overline{\cos\varphi}$ is the average cosine of the mean azimuthal observations of the clustered point cloud, $\overline{\sin\varphi}$ is the average sinusoidal of the mean azimuthal observations of the clustered point cloud. In the above equation, the trajectory motion state $x$, $v_x$, $a_x$, $y$, $v_y$, $a_y$ is taken as an example, representing the x-direction position, x-direction velocity component, x-direction acceleration component, y-direction position, y-direction velocity component and y-direction acceleration component of the target respectively. The motion state of the actual trajectory is not limited to this form, but can be converted to it to make use of the observational models described above. Step 4 comprises the following specific steps: 4.1. For the existing trajectory that has been associated, calculate the predicted observation value of the trajectory based on the predicted motion state of the trajectory and the observation model described above; 4.2. Subtract the corresponding clustered eigenvalues from the predicted observations to obtain the residuals. 4.3. Multiply the residuals by the filter gain and add the trajectory predicted motion state to get the updated result of the already associated trajectory motion state. 4.4 For an existing track that has not been associated, if its cumulative number of consecutive unassociated times is less than the preset threshold, the trajectory prediction result will be used as the update result to continue extrapolation, otherwise the trajectory will be deleted directly.

Step 5 Generating a new trajectory comprises the following specific steps: 5.1 Using the center of clustering as the new trajectory start position; 5.2 Using clustered heading angle features as velocity directions for new trajectories, the clustered mean radial velocities are back-projected into the heading angle direction to obtain the velocity of the new trajectory; 5.3 Take the new trajectory acceleration to zero; 5.4 Take the clustered length features and width features are used as the length and width of the new trajectory respec-
tively, and heading angle features are used as the starting heading angle of the new trajectory.

Step 6 comprises the following specific steps: 6.1 The trajectory sizes were weighted and averaged with the clustered sizes to obtain the trajectory size update results; 6.2 Based on the velocity vector and acceleration vector of the trajectory motion state, the acceleration component perpendicular to the direction of the velocity vector is computed, the magnitude of the transverse pendulum angular velocity of the target is then obtained by dividing the mode of the vertical acceleration component by the mode of the velocity vector, and the direction of the cross product of the velocity vector and the acceleration vector is the direction of the transverse pendulum angular velocity; 6.3 The velocity heading angle is calculated based on the trajectory speed, and the clustered heading angle features, velocity heading angle, and trajectory heading angle are weighted and averaged to obtain the trajectory heading angle update results.

As a specific embodiment of the present invention, this method of the present invention for realizing target feature extraction and multi-target tracking based on 4D millimeter wave radar specifically comprises the following steps:

Step 1: After acquiring a radar point cloud, carry out point cloud pre-processing, including deleting points with abnormal velocity, deleting points with abnormal height, filtering points outside the region of interest, and the like.

Step 2: Clustering the pre-processed points. DBSCAN clustering is used in this embodiment, the minimum number of neighborhoods of the core points is taken as 3, and the discriminative condition of the neighborhoods is:

$$\begin{cases} |x_i - x_j| < 0.5 \text{ m} \\ |y_i - y_j| < 0.5 \text{ m} \\ |z_i - z_j| < 2.0 \text{ m} \\ |vr_i - vr_j| < 2.0 \text{ m/s} \end{cases}$$

where i, j denote the indexes of the two points involved in the discrimination, x, y, z and vr denote the coordinate position of each point respectively and the relative radial velocity.

Step 3: For each cluster, feature extraction is performed.
3.1 Calculate the clustered mean radial velocity $\overline{vr}$, the x-mean $\overline{x}$ and the y-mean $\overline{y}$;
3.2 Determine the extreme deviation of the clustered points in the z-axis direction to obtain the cluster height feature;
3.3 Subtract $\overline{x}$, $\overline{y}$ from the x, y coordinates of each point under the same clustering to get $x_i$, $y_i$ respectively; traversing the range 0 to 90° at 1° intervals and rotating all the resulting $x_i$, $y_i$ at each angle, determine the rotated $x_{max}$, $y_{max}$, $x_{min}$ and $y_{min}$, and compute the loss function:

$$\text{Loss} = \sum_{i=1}^{N} \min(x_i - x_{min}, x_{max} - x_i, y_i - y_{min}, y_{max} - y_i)$$

the minimum angular value of angle and the corresponding $x_{max}$, $y_{max}$, $x_{min}$ and $y_{min}$ of the said loss function are also recorded;
3.4 Use the larger of $(x_{max} - x_{min})$ and $(y_{max} - y_{min})$ as the clustering length feature and the smaller as the clustering width feature, and use the mean $x_{mean}$ of $x_{mean}$, $x_{min}$ and the mean $y_{mean}$ of $y_{max}$, $y_{min}$ after rotating by −angle, and then add $\bar{x}$, $\bar{y}$ to get the value as the clustering center coordinates;

3.5 Calculate clustered heading angle features. if $(x_{max}-x_{min}) < (y_{max}-y_{min})$, angle increases by 90 degrees, if the angle between the direction of angle and the direction of the mean radial velocity (mean velocity greater than zero, pointing from the origin to the center of the cluster, and vice versa, pointing from the center of the cluster to the origin) exceeds 90 degrees, the angle is increased by another 180 degrees and the final angle value is taken as the heading angle feature for clustering.

Figure 2:
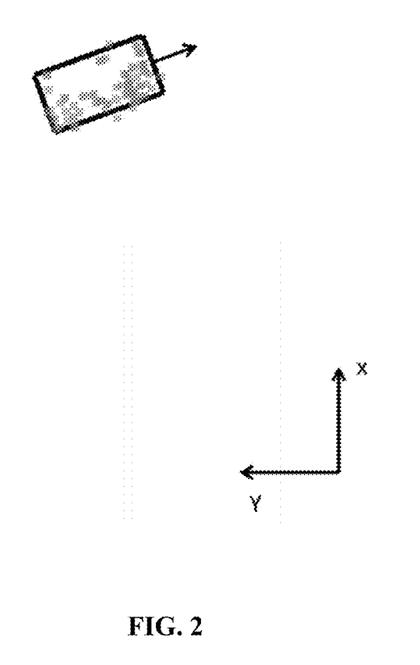
FIG. 2 shows the effect of feature extraction on point cloud clustering and representation into a rectangular bounding box of the present invention.
Figure 3:
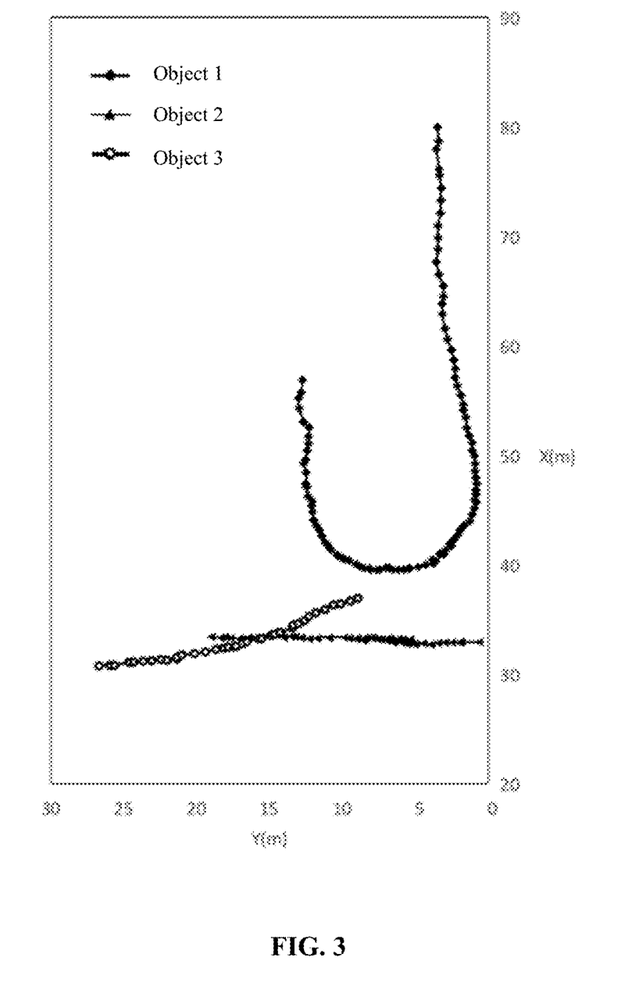
FIG. 3 shows a schematic diagram of the effect of target tracking of a motor vehicle in a specific embodiment of the present invention.

In this embodiment, a rectangular bounding box representing the target is constructed based on the clustering features (center coordinates, length, width, height, heading angle), with the effect shown in FIG. 2.

Step 4: Motion state prediction for existing trajectory. Here the motion state is taken as $(x, v_x, a_x, y, v_y, a_y)$, then the prediction can be done using linear Kalman filter prediction process:

$$\begin{bmatrix} x_{pred} \\ v_{xpred} \\ a_{xpred} \\ y_{pred} \\ v_{ypred} \\ a_{ypred} \end{bmatrix} = \begin{bmatrix} 1 & T & 0.5T^2 & 0 & 0 & 0 \\ 0 & 1 & T & 0 & 0 & 0 \\ 0 & 0 & 1 & 0 & 0 & 0 \\ 0 & 0 & 0 & 1 & T & 0.5T^2 \\ 0 & 0 & 0 & 0 & 1 & T \\ 0 & 0 & 0 & 0 & 0 & 1 \end{bmatrix} \begin{bmatrix} x \\ v_x \\ a_x \\ y \\ v_y \\ a_y \end{bmatrix}$$

Step 5: Correlate the existing trajectory prediction results with the clustering.

5.1 Using the length and width of the existing trajectory, to calculate the diagonal length, the upper bound dist_cri of the association distance is calculated by weights of 0.6 and 0.4; calculate the Euclidean distance between the predicted position of the existing trajectory $(x_{pred}, y_{pred})$ with the clustering center, and calculate the distance correlation score:

$$\text{distance\_score} = \begin{cases} 0, & dist > \text{dist\_cri} \\ \left(1 - \dfrac{dist}{\text{dist\_cri}}\right) \times 100, & dist \le \text{dist\_cri} \end{cases}$$

5.2 The coordinates of the vertices of the rectangular box and the area of the rectangular box are calculated based on the position, size, and heading angle of the existing trajectories and clusters, and the size correlation score is calculated:

area_score =
$$\begin{cases} 100, & \text{An overlap between the existing trajectories and the clustering results} \\ \left(1 - \dfrac{\min(\text{existing trajectory area, cluster area})}{\max(\text{existing trajectory area, cluster area})}\right) \times 100, & \text{otherwise} \end{cases}$$

5.3 The predicted mean radial velocity was calculated and subtracted from the clustered point cloud mean radial velocity to obtain the difference delta_vr and calculate the velocity correlation score:

$$\text{velocity\_score} = \begin{cases} 0, & |\text{delta\_vr}| > \text{vr\_cri} \\ \left(1 - \dfrac{|\text{delta\_vr}|}{\text{vr\_cri}}\right) \times 100, & |\text{delta\_vr}| \le \text{vr\_cri} \end{cases}$$

where vr_cri is the preset threshold, 2.5 m/s is taken in this embodiment.

5.4 The distance correlation score, size correlation score and speed correlation score are weighted and summed to calculate a final score. The weights in this embodiment are 0.4, 0.3, and 0.3, respectively.

5.5 A final score for each existing trajectory with each cluster is calculated and a score matrix is constructed for matching. In this embodiment, each element of the score matrix is subtracted from 100 to convert the score matrix to a cost matrix.

5.6 Subtract each row of the cost matrix from the smallest element of that row, and subsequently subtract each column of the matrix from the smallest element of that column.

5.7 Thread all the zeros in the new matrix with the least number of rows and columns and check if the allocation is currently optimal. If the row and column lines do not thread all the elements of the matrix, go to step 5.8, otherwise go to step 5.9.

5.8 Find the smallest element of the elements where the rows and columns are not threaded together, subtract the smallest element from the remaining elements, add the smallest element to the element that corresponds to the intersection of the rows and columns, and go back to step 5.7.

5.9 Find the 0 element corresponding to each row and the 0 element corresponding to the column, and find the optimal allocation based on the 0 element.

Step 6: Kalman filtering is applied to the successfully associated trajectories to update the motion state.

Step 7: eliminate determination for trajectories with failed associations. If the number of extrapolated frames of the existing trajectory has reached a preset threshold, which is taken to be 3 frames in this embodiment, the trajectory is deleted, otherwise the prediction result of the existing trajectory is used as the extrapolation result.

Step 8: Establish a new trajectory based on the clustering of correlation failures. The motion state parameters of the new trajectory are:

$$\begin{bmatrix} x \\ v_x \\ a_x \\ y \\ v_y \\ a_y \end{bmatrix} = \begin{bmatrix} x_c \\ \dfrac{\overline{v_r}}{\cos(\text{orient} - \text{vrAngle})} \times \cos(\text{orient}) \\ 0 \\ y_c \\ \dfrac{\overline{v_r}}{\cos(\text{orient} - \text{vrAngle})} \times \sin(\text{orient}) \\ 0 \end{bmatrix}$$

where orient is the clustered heading angle feature, vrAngle is the mean direction angle of the radial velocity of the point cloud. The length and width of the new trajectory are taken from the length feature and width feature of the cluster, and the heading angle of the new trajectory is taken from the heading angle feature of the cluster.

Step 9: Calculate the transverse pendulum angular velocity for the current trajectory (including existing trajectory updates, extrapolation results and new trajectories). The magnitude of the transverse pendulum angular velocity ω is:

$$|\omega| = \frac{\sqrt{a_x^2 + a_y^2}}{\sqrt{v_x^2 + v_y^2}}$$

the cross-multiplication of the velocity vector and the acceleration vector $v_x \cdot a_y - v_y \cdot a_x$ is the plus or minus of the transverse pendulum angular velocity.

Figure 4:
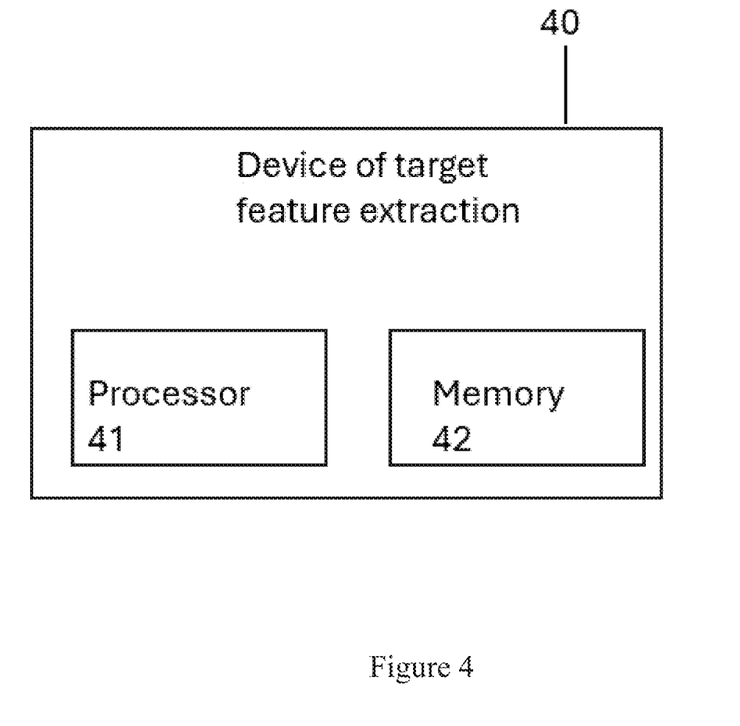
FIG. 4 shows a device of target feature extraction and multi-target tracking based on 4D millimeter wave radar.

Step 10: Update the current trajectory with sizes and heading angles. The trajectory sizes are weighted and averaged with the clustered sizes, and the weights in this embodiment are 0.7 and 0.3, respectively, to obtain the trajectory sizes update results:

Trajectory length update results=0.7×Original trajectory length+0.3×Cluster length features Trajectory width update results=0.7×Original trajectory width+0.3×Cluster width features The velocity heading angle is calculated based on the trajectory speed, and the clustered heading angle, the velocity heading angle, and the trajectory heading angle are weighted and averaged, with the weights in this embodiment being 0.4, 0.3, and 0.3, respectively, to obtain the trajectory heading angle update result:

Trajectory heading angle update result=0.4×velocity heading angle+0.3×clustered heading angle+ 0.3×Original trajectory heading angle The device 40, illustrated in FIG. 4, of target feature extraction and multi-target tracking based on 4D millimeter wave radar, wherein the said device comprises:

processor 41, configured to execute computer-executable instructions;

memory 42, storing one or more computer-executable instructions, when the said computer-executable instructions are executed by the said processor 41, various steps for realizing the method of target feature extraction and multi-target tracking based on 4D millimeter wave radar as claimed in above-described.

The processor 41 of target feature extraction and multi-target tracking based on 4D millimeter wave radar, wherein the said processor 41 being configured to execute computer-executable instructions, when the said processor 41 being configured to execute computer-executable instructions, various steps for realizing the method of target feature extraction and multi-target tracking based on 4D millimeter wave radar as claimed in above-described.

The computer-readable storage medium, wherein the computer program stored on it, and the said computer program may be executed by a processor to implement the various steps for realizing the method of target feature extraction and multi-target tracking based on 4D millimeter wave radar as claimed in above-described.

Any process or method description depicted in the flowchart or otherwise described herein may be understood to represent a module, fragment, or portion of code comprising one or more executable instructions for implementing the steps of a particular logical function or process, and that the scope of the preferred embodiments of the present invention includes additional implementations, which may be, in no particular order as shown or discussed, including performing functions in a substantially simultaneous manner or in reverse order, according to the functions involved, should be understood by those skilled in the art to which embodiments of the present invention belong.

It should be understood that various parts of the invention may be implemented with hardware, software, firmware, or combinations thereof. In the above embodiments, a plurality of steps or methods may be implemented with software or firmware stored in memory and executed by a suitable instruction execution device.

One of ordinary skill in the art can appreciate that all or some of the steps carried out to realize the method of the above embodiments can be accomplished by instructing the associated hardware by means of a program, which can be stored in a computer-readable storage medium that, when executed, comprises one of the steps of the method embodiments or a combination thereof.

The storage media mentioned above may be read-only memories, disks or CD, etc.

In the description of this specification, reference to the terms "an embodiment", "some embodiments", "example", "specific example", or "embodiment" means that a specific feature, structure, material, or characteristic described in conjunction with the embodiment or example is included in at least one embodiment or example of the present invention. In this specification, schematic representations of the above terms do not necessarily refer to the same embodiments or examples. Moreover, specific features, structures, materials, or characteristics described may be combined in any one or more embodiments or examples in a suitable manner.

Although embodiments of the present invention have been shown and described above, it is to be understood that the above embodiments are exemplary and are not to be construed as a limitation of the present invention, and that one of ordinary skill in the art may make changes, modifications, substitutions, and variations of the above embodiments within the scope of the present invention.

With the use of this method, device, processor, and computer-readable storage medium of target feature extraction and multi-target tracking based on 4D millimeter wave radar, compared with the traditional radar multi-target tracking method, it obtains information such as target size and heading angle in addition to position from the radar clustered point cloud, and fully combines this information to improve the reliability of the association between trajectory and observation in multi-target tracking; and for 4D millimeter-wave radar, a new trajectory observation model is provided, through which individual observation points of the same target can be fully utilized to update in concert; In addition to this, the present invention introduces a target transverse pendulum angular velocity as a means to enable more stable tracking of turning maneuvering targets.

In this specification, the present invention has been described with the reference to its specific embodiments. However, it is obvious still may be made without departing from the spirit and scope of the present invention, various modifications and transformation. Accordingly, the specification and drawings should be considered as illustrative rather than restrictive.

We claim:

1. A method of target feature extraction and multi-target tracking based on 4D millimeter wave radar, comprising the following steps:
   (1) acquiring point cloud data output from the radar and preprocess the point cloud data to eliminate an outlier value;
   (2) processing points acquired after preprocessing by Density-Based Spatial Clustering of Applications with Noise (DBSCAN) clustering;
   (3) processing each of acquired clusters for target feature extraction;
   (4) predicting an existing trajectory, and globally correlating prediction results with clustering results;

(5) based on correlation clustering results, executing a corresponding multi-target tracking motion state processing to obtain a transverse pendulum angular velocity;
(6) based on a target motion state, updating target size information as well as heading angle information;
wherein step (2) comprises:
  performing the DBSCAN clustering process based on a coordinate position of each point in the point cloud data and a relative radial velocity as:

$$\begin{cases} |x_i - x_j| < 0.5 \text{ m} \\ |y_i - y_j| < 0.5 \text{ m} \\ |z_i - z_j| < 2.0 \text{ m} \\ |vr_i - vr_j| < 2.0 \text{ m/s} \end{cases}$$

where i, j denote indexes of two points involved in a discrimination, x, y, z denote a coordinate position of each point respectively, and vr denotes a relative radial velocity;
wherein said step (3) comprises the following steps:
  (3.1) calculating a clustered mean radial velocity $\overline{vr}$, the x-mean $\overline{x}$ and the y-mean $\overline{y}$;
  (3.2) counting a maximum value and a minimum value of the clustered points in a z direction, and using a difference of the maximum value minus the minimum value as a cluster height feature;
  (3.3) subtracting $\overline{x}$, $\overline{y}$ from the x, y coordinates of each point under a same clustering to get $x_i$, $y_i$ respectively;
  (3.4) traversing a range 0 to 90° at 1° intervals and rotating all resulting $x_i$, $y_i$ at each angle, determining a rotated $x_{max}$, $y_{max}$, $x_{min}$ and $y_{min}$, and computing a loss function using the following equation:

$$\text{Loss} = \sum_{i=1}^{N} \min(x_i - x_{min}, x_{max} - x_i, y_i - y_{min}, y_{max} - y_i)$$

wherein a minimum angular value of angle and a corresponding $x_{max}$, $y_{max}$, $x_{min}$ and $y_{min}$ of said loss function are recorded;
  (3.5) using a larger of ($x_{max} - x_{min}$) and ($y_{max} - y_{min}$) as a clustering length feature and a smaller of ($x_{max} - x_{min}$) and ($y_{max} - y_{min}$) as a clustering width feature, and using a mean $x_{mean}$ of $x_{max}$, $x_{min}$ and a mean $y_{mean}$ of $y_{max}$, $y_{min}$ after rotating by $-$angle, and then adding $\overline{x}$, $\overline{y}$ to get a value as clustering center coordinates ($x_c$, $y_c$);
  (3.6) if ($x_{max} - x_{min}$) < ($y_{max} - y_{min}$), angle increases by 90 degrees, and an angle is more than 90 degrees with a direction of an average radial velocity $\overline{vr}$, then increasing the angle by another 180 degrees and a final angle value is taken as a heading angle feature for clustering;
  (3.7) according to said clustering center coordinates, said clustering length features, said clustering width features, said clustering height features and said heading angle features obtained as described above, a clustered rectangular target bounding box is constructed for subsequent target feature extraction processing;
wherein said step (4) specifically comprises the following steps:

(4.1) taking motion states as x, $v_x$, $a_x$, y, $v_y$, $a_y$ and processing an existing trajectory prediction using linear Kalman filtering as:

$$\begin{bmatrix} x_{pred} \\ v_{xpred} \\ a_{xpred} \\ y_{pred} \\ v_{ypred} \\ a_{ypred} \end{bmatrix} = \begin{bmatrix} 1 & T & 0.5T^2 & 0 & 0 & 0 \\ 0 & 1 & T & 0 & 0 & 0 \\ 0 & 0 & 1 & 0 & 0 & 0 \\ 0 & 0 & 0 & 1 & T & 0.5T^2 \\ 0 & 0 & 0 & 0 & 1 & T \\ 0 & 0 & 0 & 0 & 0 & 1 \end{bmatrix} \begin{bmatrix} x \\ v_x \\ a_x \\ y \\ v_y \\ a_y \end{bmatrix}$$

where $v_x$ is ax-direction velocity component, $a_x$ is a x-direction acceleration component, $v_y$ is a y-direction velocity component, $a_y$ is a y-direction acceleration component, $x_{pred}$ is a predicted value of the target's x-direction position, $v_{xpred}$ is a predicted value of a x-direction velocity component, $a_{xpred}$ is a predicted value of the x-direction acceleration component, $y_{pred}$ is a predicted value of the target's y-direction position, $v_{ypred}$ is a predicted value of the y-direction velocity component, $a_{ypred}$ is a predicted value of the y-direction acceleration component, and T is a time interval between two neighboring frames of a radar point cloud;
(4.2) calculating a diagonal length dist_cri_1 using a length and a width of an existing trajectory:

$$\text{dist\_cri\_1} = \sqrt{\text{the length of the existing trajectory}^2 + \text{the width of the existing trajectory}^2}$$

wherein the diagonal length dist_cri_2 is calculated using the clustered length and width features:

$$\text{dist\_cri\_2} = \sqrt{\text{clustered length features}^2 + \text{clustered width features}^2}$$

and weighted by weights of 0.6 and 0.4 to calculate an upper limit of the association distance dist_cri dist_cri=0.6×dist_cri_1+0.4×dist_cri_2;

calculating a Euclidean distance dist between a predicted position of the existing trajectory ($x_{pred}$, $y_{pred}$) and a clustering center:

$$\text{dist} = \sqrt{(x_c - x_{pred})^2 + (y_c - y_{pred})^2}$$

and calculating a distance correlation score according to the following equation:

$$\text{distance\_score} = \begin{cases} 0, & \text{dist} > \text{dist\_cri} \\ \left(1 - \dfrac{\text{dist}}{\text{dist\_cri}}\right) \times 100, & \text{dist} \le \text{dist\_cri} \end{cases}$$

(4.3) based on an existing trajectory prediction position, a clustering position, a size, and the heading angle, coordinates of the vertices of each vertex of a clustered rectangular target bounding box and an area of a rectangular box are calculated, and a size correlation score is calculated according to the following equation:

$$\text{area\_score} = \begin{cases} 100, & \text{An overlap between the existing trajectories and the clustering results} \\ \left(1 - \dfrac{\min(\text{existing trajectory area, cluster area})}{\max(\text{existing trajectory area, cluster area})}\right) \times 100, & \text{otherwise} \end{cases}$$

(4.4) based on predicted positions, predicted velocities and pendulum angular velocities of existing trajectories, a predicted radial velocities of each point of to-be-associated clusters are calculated by the following equation:

$$v_{ri} = (v_{xpred} - \omega y_{pred})\cos\varphi_i + (v_{ypred} + \omega x_{pred})\sin\varphi_i$$

where $v_{ri}$ denotes a predicted radial velocity, $\omega$ denotes a target transverse swing angular velocity, and $\varphi_i$ denotes a radial velocity direction of each point in a clustered point cloud;

wherein an average predicted radial velocity is acquired by averaging the predicted radial velocities at each point within a same cluster, and a difference is made with a measured average radial velocity of a cluster, a difference delta_vr is obtained, and a speed correlation score is calculated by using the following equation:

$$\text{velocity\_score} = \begin{cases} 0, & |\text{delta\_vr}| > \text{vr\_cri} \\ \left(1 - \dfrac{|\text{delta\_vr}|}{\text{vr\_cri}}\right) \times 100, & |\text{delta\_vr}| \leq \text{vr\_cri} \end{cases}$$

where vr_cri is a preset threshold;

(4.5) acquiring, weighing and summing a distance correlation score, a size correlation score, and a speed correlation score acquired to obtain a final correlation score of a trajectory with the clusters; and (4.6) constructing an association matrix based on final association scores of each cluster with each a plurality of existing trajectories, including: a number of rows of the association matrix being equal to a number of existing trajectories, a number of columns of the association matrix being a number of current clusters, a value of an i-th row and a j-th column of the association matrix being an association score of an i-th existing track with a j-th cluster, and a global association matching being performed based on the association matrix.

2. The method of target feature extraction and multi-target tracking based on 4D millimeter wave radar according to claim 1, wherein said step (1) comprises:

acquiring point cloud data output from the radar and performing data preprocessing of said point cloud data to remove points with abnormal velocities, remove points with abnormal heights, and filter points outside a region of interest to remove outlier values.

3. The method of target feature extraction and multi-target tracking based on 4D millimeter wave radar according to claim 1, wherein said step (5) comprises:

computing observation model of trajectories using the following equation:

$$\begin{pmatrix} x_c \\ y_c \\ \overline{v_r} \end{pmatrix} = \begin{bmatrix} 1 & 0 & 0 & 0 & 0 & 0 \\ 0 & 0 & 0 & 1 & 0 & 0 \\ 0 & \overline{\cos\varphi} & 0 & 0 & \overline{\sin\varphi} & 0 \end{bmatrix} \begin{pmatrix} x \\ vx \\ ax \\ y \\ vy \\ ay \end{pmatrix}$$

where $x_c$, $y_c$ are clustering centers, $\overline{v_r}$ is the mean radial velocity of a clustered point cloud, $\overline{\cos\varphi}$ is an average cosine of mean azimuthal observations of the clustered point cloud, $\overline{\sin\varphi}$ is an average sinusoidal of the mean azimuthal observations of the clustered point cloud, x, vx, ax, y, vy and ay are motion states of the trajectory.

4. The method of target feature extraction and multi-target tracking based on 4D millimeter wave radar according to claim 3, wherein said step (5) comprises the following steps:

(5.1) determining whether corresponding clusters are successfully associated with each existing trajectory, if yes, go to step (5.2), otherwise, go to step (5.4);

(5.2) for associated pre-existing trajectories, predicted observations $x_{cpred}$, $y_{cpred}$ and $\overline{v_{rpred}}$ are computed for trajectories based on a trajectory predicted motion state and a trajectory observation model:

$$\begin{pmatrix} x_{cpred} \\ y_{cpred} \\ \overline{v_{rpred}} \end{pmatrix} = \begin{bmatrix} 1 & 0 & 0 & 0 & 0 & 0 \\ 0 & 0 & 0 & 1 & 0 & 0 \\ 0 & \overline{\cos\varphi} & 0 & 0 & \overline{\sin\varphi} & 0 \end{bmatrix} \begin{pmatrix} x_{pred} \\ v_{xpred} \\ a_{xpred} \\ y_{pred} \\ v_{ypred} \\ a_{ypred} \end{pmatrix}$$

(5.3) subtracting corresponding clustered eigenvalues from predicted observations to get residuals, and multiplying the residuals by a Kalman gain matrix K and adding a trajectory predicted motion state to get an updated result of an already associated trajectory motion state:

$$\begin{pmatrix} x_{update} \\ v_{xupdate} \\ a_{xupdate} \\ y_{update} \\ v_{yupdate} \\ a_{yupdate} \end{pmatrix} = K\left(\begin{pmatrix} x_c \\ y_c \\ \overline{v_r} \end{pmatrix} - \begin{pmatrix} x_{cpred} \\ y_{cpred} \\ \overline{v_{rpred}} \end{pmatrix}\right) + \begin{pmatrix} x_{pred} \\ v_{xpred} \\ a_{xpred} \\ y_{pred} \\ v_{ypred} \\ a_{ypred} \end{pmatrix}$$

where $x_{update}$, $v_{xupdate}$, $a_{xupdate}$, $y_{update}$, $v_{yupdate}$ and $a_{yupdate}$ are updated trajectory motion states;

(5.4) eliminating a determination of a trajectory that fails to be associated, if its consecutive cumulative number of unassociated times is less than a preset threshold and using a trajectory prediction result an update result to continue a trajectory extrapolation;

(5.5) creating a new trajectory clusters with failed associations, and expressing motion state parameters of a new trajectory using the following equation:

$$\begin{bmatrix} x \\ v_x \\ a_x \\ y \\ v_y \\ a_y \end{bmatrix} = \begin{bmatrix} x_c \\ \dfrac{\overline{v_r}}{\cos(\text{orient} - \text{vrAngle})} \times \cos(\text{orient}) \\ 0 \\ y_c \\ \dfrac{\overline{v_r}}{\cos(\text{orient} - \text{vrAngle})} \times \sin(\text{orient}) \\ 0 \end{bmatrix}$$

where orient is a clustered heading angle feature, vrAngle is a mean direction angle of a radial velocity of the radar point cloud, (5.6) based on currently acquired update results of the associated trajectory motion state, trajectory extrapolation results, and calculation results of the new trajectory motion state, a corresponding transverse pendulum angular velocity co is calculated by the following equation:

$$|\omega| = \dfrac{\sqrt{a_x^2 + a_y^2}}{\sqrt{v_x^2 + v_y^2}}$$

where positive and negative values of $v_x??a_y - v_y??a_x$, a result of the cross-multiplication of the velocity vector and an acceleration vector, are taken as positive and negative values of the transverse pendulum angular velocity.

5. The method of target feature extraction and multi-target tracking based on 4D millimeter wave radar according to claim 4, wherein said step (5.5) comprises the following steps:

(5.5.1) using a center of clustering as a new trajectory start position;
(5.5.2) using clustered heading angle features as velocity directions for new trajectories, wherein clustered mean radial velocities are back-projected into a heading angle direction to obtain a velocity of a new trajectory;
(5.5.3) taking a new trajectory acceleration to zero;
(5.5.4) taking a clustered length feature as a length of the new trajectory, taking a clustered width feature as a width of the new trajectory, and taking a clustered heading angle feature as a heading angle of the new trajectory.

6. The method of target feature extraction and multi-target tracking based on 4D millimeter wave radar according to claim 4, wherein said step (6) comprises the following steps:

(6.1) a trajectory length is weighted and averaged with clustered length features to get trajectory length update results, and a trajectory width is weighted and averaged with clustered width features to get trajectory width update results;
(6.2) based on a velocity vector and an acceleration vector of a trajectory motion state, an acceleration component perpendicular to a direction of the velocity vector is computed, a magnitude of a transverse pendulum angular velocity of the target is then obtained by dividing a mode of a vertical acceleration component by a mode of the velocity vector, and a direction of a cross product of the velocity vector and the acceleration vector is the direction of the transverse pendulum angular velocity;
(6.3) a velocity heading angle is calculated based on a trajectory speed, and clustered heading angle features, velocity heading angle, and trajectory heading angle are weighted and averaged to obtain trajectory heading angle update results.

7. A device of target feature extraction and multi-target tracking based on 4D millimeter wave radar, comprising:
a processor, configured to execute computer-executable instructions;
a memory, storing one or more computer-executable instructions, when executed by said processor, for performing the method of target feature extraction and multi-target tracking based on 4D millimeter wave radar as claimed in claim 1.

8. A processor of target feature extraction and multi-target tracking based on 4D millimeter wave radar, configured to execute computer-executable instructions to perform the method of target feature extraction and multi-target tracking based on 4D millimeter wave radar as claimed in claim 1.

9. A non-transitory computer-readable storage medium, storing a computer program to be executed by a processor to implement the method of target feature extraction and multi-target tracking based on 4D millimeter wave radar as claimed in claim 1.

* * * * *